United States Patent
Fieldson et al.

(10) Patent No.: US 6,672,541 B2
(45) Date of Patent: Jan. 6, 2004

(54) FLIGHT CREW REST AND ATTENDANT REST ENVIRONMENTAL CONTROL SYSTEM

(75) Inventors: Charles A. Fieldson, Bothell, WA (US); Andre G. Brasseur, Everett, WA (US); Gregory L. Campbell, deceased, late of Stanwood, WA (US), by Laura Joy Campbell, executor; Paul A. Gifford, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/058,819

(22) Filed: Jan. 28, 2002

(65) Prior Publication Data

US 2003/0141412 A1 Jul. 31, 2003

(51) Int. Cl.$^7$ .................................... B64D 11/00
(52) U.S. Cl. ............................ 244/118.5; 244/154 R
(58) Field of Search ................ 244/117 R, 118.1, 244/118.5, 134 R, 1 B, 134 D, 163; 454/71, 72, 73, 74, 76; 55/418, 418.1

(56) References Cited

U.S. PATENT DOCUMENTS

| | | | | |
|---|---|---|---|---|
| 2,092,655 A | * | 9/1937 | Page, Jr. ................ 244/118.6 |
| 2,869,535 A | * | 1/1959 | Horrell .................. 126/110 R |
| 2,881,687 A | * | 4/1959 | Manor ........................ 454/76 |
| 3,269,801 A | * | 8/1966 | Boberg et al. ............. 422/190 |
| 3,313,118 A | * | 4/1967 | Boehmer .................. 62/176.4 |
| 3,825,212 A | * | 7/1974 | Darges et al. ........... 244/118.5 |
| 4,814,579 A | * | 3/1989 | Mathis et al. ............... 219/202 |
| 6,375,849 B1 | * | 4/2002 | Crabtree et al. ............ 210/652 |
| 6,449,963 B1 | * | 9/2002 | Ng et al. ...................... 62/86 |
| 2003/0141412 A1 | * | 7/2003 | Fieldson et al. ......... 244/118.5 |

* cited by examiner

Primary Examiner—Charles T. Jordan
Assistant Examiner—Stephen Holzen
(74) Attorney, Agent, or Firm—Black Lowe & Graham

(57) ABSTRACT

The present invention provides a temperature control system for an aircraft ventilation system that couples with existing aircraft upstream ventilation system architecture and downstream ventilation system architecture. The temperature control system includes an air duct arranged to receive a volume of ventilation air from the upstream ventilation system architecture and transfer the volume of air to the downstream ventilation system architecture. At least one heater is interposed within the duct and is arranged to heat the ventilation air. Additionally, at least one temperature sensor that is in thermodynamic communication with the volume of air within the duct is located downstream from the at least one heater and is arranged to determine an actual temperature of the ventilation air. A controller is in electrical communication with the at least one heater and the at least one temperature sensor. The controller is programmed with a predetermined range of temperatures above the freezing point of water. The controller is arranged to control the heater responsive to a comparison of the actual temperature of the ventilation air to the predetermined range of temperatures. The controller maintains the actual ventilation air temperature within the predetermined range of temperatures such that formation of ice is minimized in the aircraft ventilation system.

22 Claims, 3 Drawing Sheets

FLIGHT CREW REST AND ATTENDANT REST ENVIRONMENTAL CONTROL SYSTEM

FIELD OF THE INVENTION

This invention relates generally to aircraft ventilation systems and, more specifically, to control of aircraft crew rest area ventilation air systems.

BACKGROUND OF THE INVENTION

Commercial aircraft around the world often undertake flights in excess of eight hours in length. Because of a need for adequate rest facilities for the flight crew and cabin crew members, rest areas are provided within the aircraft for use by the crew members while the aircraft is in flight or on the ground. Typically, the rest areas are relatively small, such as, single person units remotely located in the vicinity of the aircraft's cockpit.

Ventilation systems in the rest areas are typically tied directly into the aircraft's main ventilation system. Obtaining and maintaining a habitable environment within the rest areas and complying with safety regulations has been a problem due to a number of factors. These factors include a relatively large size of the main ventilation system of the aircraft, wide ranging atmospheric environmental conditions, a relatively small size of the rest areas, and locations of the rest areas in remote parts within the aircraft.

Cool air pulled from the aircraft's main air conditioning pack is often excessively cold for relatively small rest areas. If the aircraft's main ventilation system is continually running, the rest area is too cold to occupy until the rest area can be adequately heated. Conversely, if the ventilation system is shut down for any appreciable length of time, especially in warmer climates, the rest areas can become too hot to occupy. In either case, the rest areas and the items within the rest area represent a thermal mass which, inherently, increases the time required to heat or cool the space to a habitable level. This additional length of uninhabitable time reduces the amount of time a crew member can rest when the crew member has the time available for resting. This can lead to some crew members not receiving enough rest.

Another problem with pulling air directly from the main air conditioning pack is the adverse effect on ventilation system components. More specifically, under certain atmospheric conditions, such as those encountered on the ground or in flight less than 25,000 feet, icing can occur in the ventilation system. Icing can detrimentally affect operation of shut-off valves and other components downstream from the air conditioning packs, thus creating an undesirable or uncertifiable ventilation condition.

Therefore, there is an unmet need in the art for a system for maintaining habitable conditions in aircraft crew rest areas.

SUMMARY OF THE INVENTION

The invention provides a reliable system for controlling crew rest air ventilation temperature such that the crew rest area climate is continually maintained in a habitable condition throughout ground and all flight operations.

The present invention provides a temperature control system for an aircraft ventilation system that couples with existing aircraft upstream ventilation system architecture and downstream ventilation system architecture. The temperature control system includes an air duct arranged to receive a volume of ventilation air from the upstream ventilation system architecture and transfer the volume of air to the downstream ventilation system architecture. At least one heater is interposed within the duct and is arranged to heat the ventilation air. Additionally, at least one temperature sensor that is in thermodynamic communication with the volume of air within the duct is located downstream from the at least one heater and is arranged to determine an actual temperature of the ventilation air. A controller is in electrical communication with the at least one heater and the at least one temperature sensor. The controller is programmed with a predetermined range of temperatures above the freezing point of water. The controller is arranged to control the heater responsive to a comparison of the actual temperature of the ventilation air to the predetermined range of temperatures. The controller maintains the actual ventilation air temperature within the predetermined range of temperatures such that formation of ice is minimized in the aircraft ventilation system.

In accordance with further aspects of the invention, the present invention provides a method of preventing icing conditions in an aircraft ventilation system. The method includes receiving ventilation air from an upstream ventilation system architecture of an aircraft ventilation system, passing the ventilation air through a heater at a first location and sensing an actual ventilation air temperature at a second location downstream from the first location. A controller compares the actual ventilation air temperature with a predetermined range of temperatures above the freezing point of water, and subsequently controls the heater responsive to the comparison of the actual air temperature with the predetermined range of temperatures to maintain the actual air temperature within the predetermined range of temperatures. The continual sensing, comparing and controlling of the air ventilation temperature minimizes the formation of ice in the aircraft ventilation system.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
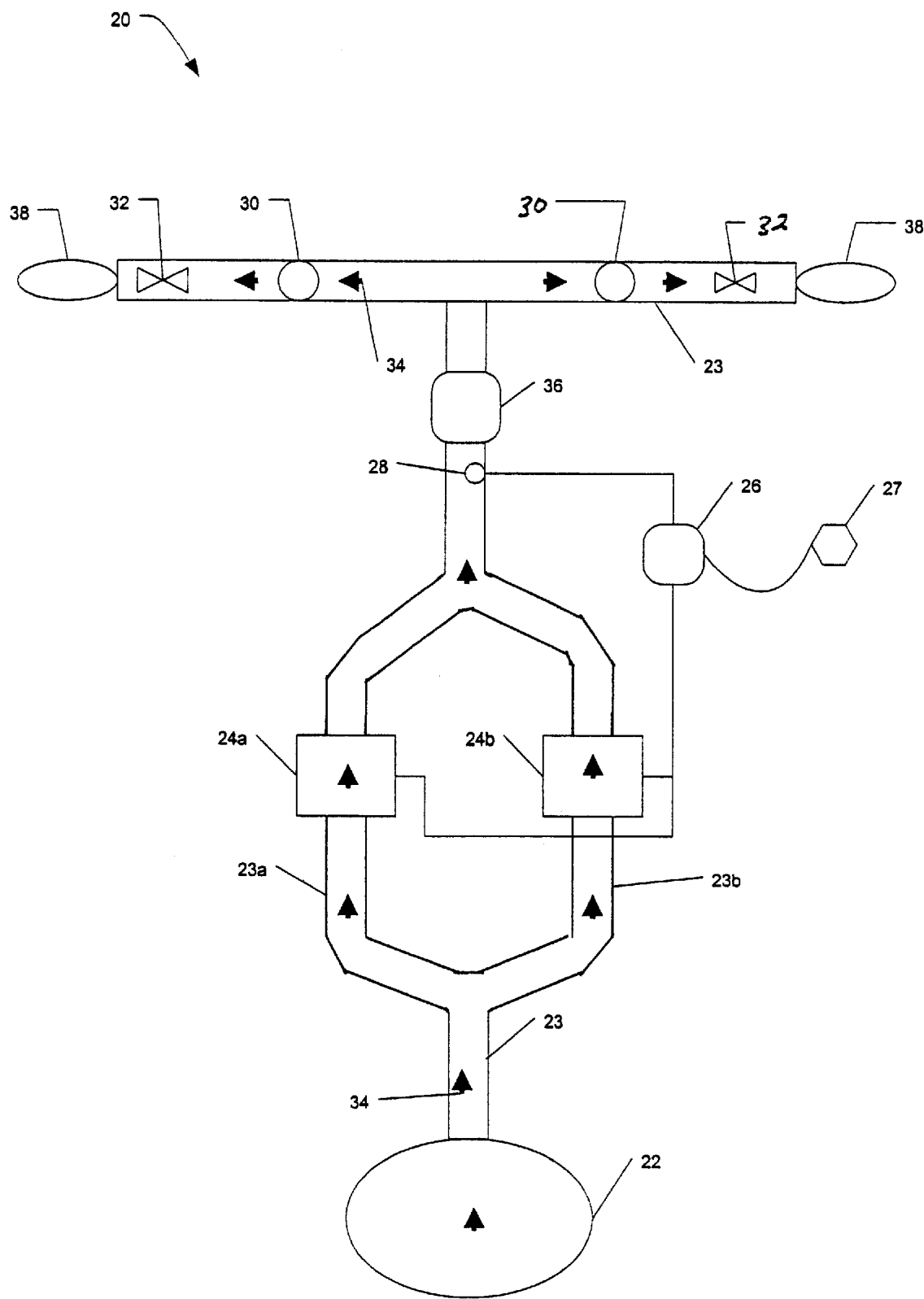
FIG. 1 is a schematic diagram of the heating system of this invention.

The present invention provides a method and system for aircraft ventilation and temperature control during ground operations and all phases of flight. By way of overview and with reference to FIGS. 1 and 2, one presently preferred embodiment of the present invention includes a pre-heat temperature control system 20 that is adaptable to an aircraft's upstream and downstream ventilation system architectures 22 and 38, respectively. The system 20 includes an in-line heater 24 for heating ventilation air passing therethrough; a temperature sensor 28 downstream from the heater 24 for determining actual ventilation air temperature; a controller 26 in electrical communication with the temperature sensor 28 and the heater 24, for controlling the heater 24 such that downstream air temperature is maintained within a predetermined temperature range; a system fault indicator 27 electrically coupled to the controller 26 for providing an alert; and at least one in-line screen 30 for preventing ice and the like from passing further downstream. Referring now to FIG. 2, in an alternative embodiment of the present invention, a humidifier 36 may be included with the control system 20 to increase ventilation air moisture content if desired. Specific details of the control system 20 are described in more detail below.

Figure 2:
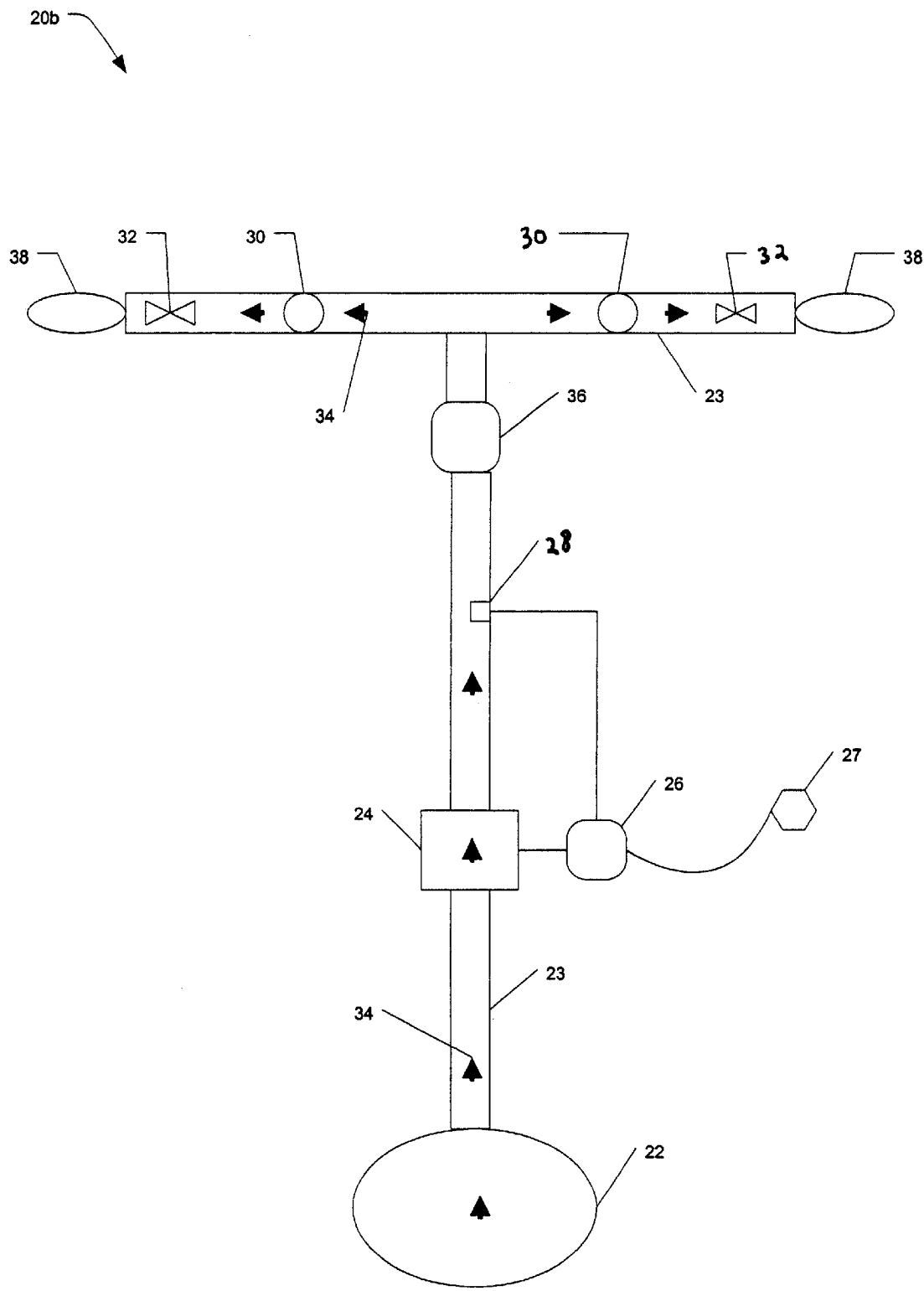
FIG. 2 is a schematic diagram of an alternative embodiment of this invention; and, FIG. 3 is a flowchart of a method of operation of this invention.

Referring now to FIGS. 1 and 2, the present invention is preferably used with ventilation systems dedicated to aircraft flight crew and cabin crew rest areas. More specifically, the present invention is preferably used with a ventilation system for an overhead flight crew rest (OFCR) and overhead flight attendant rest (OFAR) and the present invention can be included on a lower lobe attendant rest (LLAR) and a main deck crew rest (MDCR). However, it will be appreciated that the control system 20 may be used with other ventilation systems, such as, without limitation, cockpit, passenger compartments or storage area ventilation systems (not shown).

Referring now to FIGS. 1 and 2, a presently preferred control system 20 is shown. It will be appreciated that the upstream stream and downstream ventilation system architectures 22 and 38 respectively, are well known in the art. Additionally, components used in the present invention, such as, without limitation, the heaters 24, temperature sensor 28, controller 26, ice screens 30, humidifiers 36, and system fault indicators 27 are also well known components in the art. As a result, a detailed explanation of the upstream and downstream ventilation architecture 22 and 38 respectively or the components is not necessary for understanding this invention.

FIG. 1 depicts an embodiment of the control system 20 layout. Initially, conditioned air is received by the control system 20 from the upstream ventilation system architecture 22 in the direction indicated by air flow direction 34. The air from the upstream ventilation system architecture 22 is commonly provided at temperatures well below 20 degrees Fahrenheit, and is generally controlled such that the maximum air temperature entering the control system is about 40 degrees Fahrenheit.

As shown in FIG. 1, a presently preferred embodiment of the present invention employs parallel air supply ducts 23a and 23b at the heater 24, wherein heaters 24a and 24b are located in duct branches 23a and 23b, respectively. Additionally, the parallel ducts 23a and 23b, converts back to a single duct 23 upstream of the temperature sensor 28. However, other duct architecture is considered within the scope of this invention, such as, without limitation, a single, series-type duct 23 with at least one heater 24 located within the duct 23, as shown in FIG. 2. Likewise, it is anticipated that a plurality of temperature sensors 28 can be used, either as redundant sensors 28 in a single duct 23 or as single sensors 28 in each branch of multi-branch ducts 23a and 23b.

The heaters 24 are suitably 2.25 kW in-line heaters 24. An exemplary heater 24, without limitation, is a "supplemental air heater" by Goodrich Aerospace, PN 4E3239-1. This heater 24 allows for efficient thermal transfer from the heater 24 to the passing air without excessively impeding air movement. It will be appreciated that other heaters of different power ratings may be used as desired for a particular application.

The temperature sensor 28 is suitably a standard temperature sensor commonly known in the art, such as, without limitation, a thermocouple or thermister. An exemplary temperature sensor, without limitation, is manufactured by Hamilton Standard, PN 810211-2. The temperature sensor 28 may be located as desired, provided adequate mixing occurs, per industry standard, depending upon the architecture of duct 23 and mass flow rate of the ventilation air. As discussed above, in a presently preferred embodiment, the temperature sensor 28 is located downstream from the heater 24.

In a presently preferred embodiment, the controller 26 is suitably an analog controller. However, a digital controller is considered within the scope of this invention. An exemplary controller 26, without limitation, is by Goodrich Aerospace, PN 4E4131-1. The controller 26 is in constant electrical communication with the temperature sensor 28 and the heaters 24. The controller 26 is pre-programmed to connect or disconnect electrical power to or from the heaters 24 based upon a comparison of actual air temperature sensed by the temperature sensor 28 with a desired pre-programmed air temperature range. The controller 26 is programmed to actuate the heaters 24 in order to maintain an air temperature above about 35 degrees Fahrenheit. Preferably, the controller is programmed to maintain the air temperature in a range between about 35 degrees Fahrenheit to about 37 degrees Fahrenheit. The controller 26 also functions as a system fault sensor for the elements within the control system 20, for example, without limitation, the heater 24 and temperature sensor 28. The controller 26 electrically communicates the element's status to a remote system fault indicator 27, discussed in more detail below.

An at least one shut-off valve 32 is suitably interposed within the duct 23 downstream from the ice screen 30. The shut-off valve 32 may suitably be any shut-off valve commonly known in the art, such as, without limitation, a ball or gate valve. An exemplary shut-off valve 26, without limitation, is by Nord Micro, PN 4063-20605-01. It will be appreciated that shut-off valve 32 prevents ventilation air from entering the downstream ventilation system architecture 38 when the shut-off valve 32 is closed. By maintaining air temperature above freezing temperature, the system 20 provides a fully automated temperature control system for a ventilation system. In particular, operation of the system 20 precludes ice formation within the duct 23 and, specifically, on the supply shut-off valves 32.

A humidifier may be added to the system in order to increase air moisture content, if desired. As shown in FIG. 2, in an alternative embodiment, the humidifier 36 is suitably located downstream from the temperature sensor 28 and upstream from the ice screen 30 and shut-off valves 32. When the humidifier 36 is used, it will be appreciated that the pre-programmed temperature range of the controller 26 may need to be increased to a range of higher temperatures than the range of temperatures when the humidifier 36 is absent. This range of higher temperatures accommodates downstream thermal effects of added moisture. An example of such higher temperatures may be, without limitation, a range of 50-52 degrees Fahrenheit.

The system fault indicator 27 is suitably electrically coupled to the controller 26 and provides an indicator, for example, without limitation, a light, should the controller 26 determine a fault exists within the control system 20. An exemplary system fault indicator 27, without limitation, is by Cory, PN 18539-549. Industry standard connection and logic controllers are suitably used to notify the crew in a known manner of any independent or collective failure of the system's components.

Figure 3:
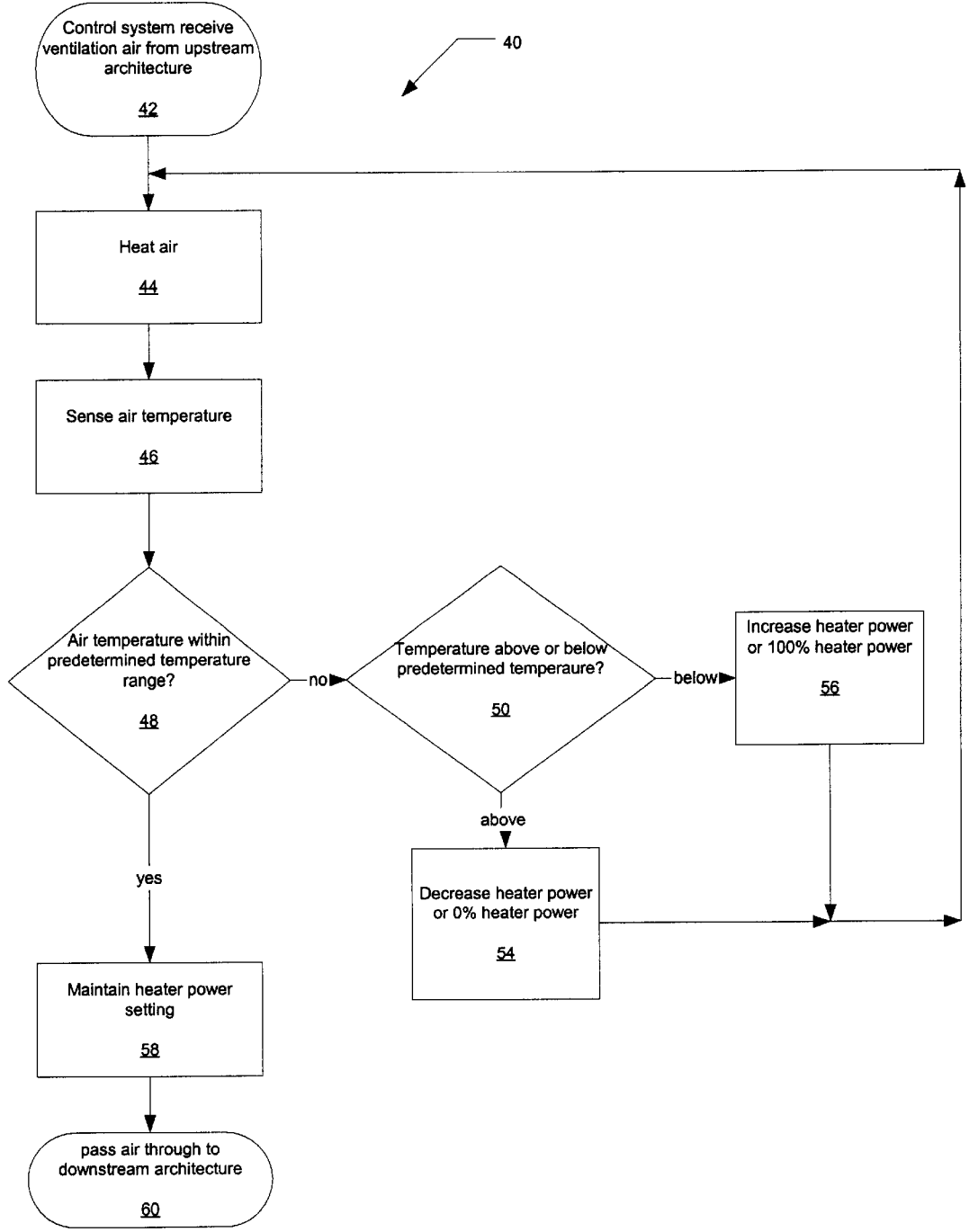

FIG. 3 shows a flow diagram for a routine 40 for operating the control system 20. Ventilation air is received by the control system 20 from the upstream ventilation architecture 22, at a block 42. As the air is received, the air is heated, at a block 44. Subsequently the air temperature is sensed at a block 46.

The sensed air temperature is communicated to the controller 26 and a comparison is made of actual air temperature and a desired air temperature range at a block 48. If the actual air temperature is within the desired air temperature range the control system 20 maintains the heater power settings, at a block 58. If the temperature is not within the desired air temperature range, another determination must be made. More specifically, a determination is made whether the actual temperature is above or below the desired air temperature range at a block 50. If the actual air temperature is above the desired air temperature range, then the controller 26 decreases power or turns the heater 24 fully off, at a block 54. Conversely, if the actual air temperature is below the desired air temperature range, at a block 56, the controller 26 increases power or turns the heater 24 fully on. This iterative logic loop continues until the actual air temperature is within the desired air temperature range.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A temperature control system for an aircraft ventilation system, the aircraft ventilation system including an upstream ventilation system architecture and a downstream ventilation system architecture, the temperature control system comprising:

an air duct arranged to receive a volume of ventilation air from an upstream ventilation system architecture of an aircraft ventilation system, to air being arranged to transfer the volume of air to a downstream ventilation system architecture of the aircraft ventilation system;

at least one beater interposed within the duct, the at least one heater being arranged to heat the ventilation air;

at least one temperature sensor in thermodynamic communication with the volume of air within the duct, the at least one temperature sensor being located downstream from the at least one heater, the at least one temperature sensor being arranged to determine actual temperature of the ventilation air; and a controller in electrical communication with the at least one heater and the at least one temperature sensor, the controller being programmed with a predetermined range of temperatures above the freezing point of water, the controller being arranged to control the heater responsive to a comparison of the temperature of the actual temperature of the ventilation air to the predetermined range of temperatures to maintain the actual ventilation air temperature within the predetermined range of temperatures such that formation of ice is minimized in the aircraft ventilation system.

2. The control system of claim 1, further comprising at least one filter interposed within the duct downstream from the temperature sensor, the filter being arranged to allow the ventilation air to pass therethrough and to minimize the passage of ice theretbrough.

3. The control system of claim 1, wherein the heater is an in-line heater with a rating of about 2.25 kW.

4. The control system of claim 1, wherein the heater increases the ventilation air temperature to at least 35 degrees Fahrenheit.

5. The control system of claim 1, wherein the controller is an analog controller.

6. The control system of claim 1, wherein the controller is a digital controller.

7. The control system of claim 1, wherein the predetermined range of temperatures is about 35 degrees Fahrenheit to about 37 degrees Fahrenheit.

8. The control system of claim 2, further comprising at least one shut-off valve interposed within the duct downstream from the filter.

9. The control system of claim 1, further comprising a humidifier interposed within the duct downstream form the heater.

10. A method of preventing icing conditions in an aircraft ventilation system, the method comprising:

receiving ventilation air from an upstream ventilation system architecture of an aircraft ventilation System;

passing ventilation air through a heater at a first location;

sensing an actual ventilation air temperature at a second location downstream from the first location;

comparing the actual ventilation air temperature with a predetermined range of temperatures above the freezing point of water; and controlling the heater responsive to the comparison of the actual air temperature with the predetermined range of temperatures to maintain the actual air temperature within the predetermined range of temperatures such that formation of ice is minimized in thin aircraft ventilation system.

11. The method of claim 10, further comprising filtering the ventilation air at a third location that is downstream from the second location.

12. The method of claim 10, wherein controlling the heater includes turning on electrical power to the heater power when the actual air temperature is lower than the predetermined range of temperatures.

13. The method of claim 10, wherein controlling the heater includes removing electrical power from the heater when, the actual ventilation air temperature is higher than the predetermined range of temperatures.

14. The method of claim 10, wherein controlling the heater includes maintaining electrical power supplied to the heater when the actual ventilation air temperature is within the predetermined range of temperatures.

15. The method of claim 10, further comprising humidifying the ventilation air to increase moisture content of the ventilation air.

16. An anti-icing system for an aircraft crew rest ventilation system, the anti-icing system comprising:

an air duct arranged to receive a volume of ventilation air from an upstream ventilation system architecture of an aircraft ventilation system, the air being arranged to transfer the volume of air to a downstream ventilation system architecture of the aircraft ventilation system;

at least one heater interposed within the duct, the at least one heater being arranged to heat the ventilation air;

at least one temperature sensor in thermodynamic communication with the volume of air within the duct, the at least one temperature sensor being located downstream from the at least one heater, the at least one temperature sensor being arranged to determine actual temperature of the ventilation air;

a controller in electrical communication with the at least one heater and the at least one temperature sensor, the controller being programmed with a predetermined range of temperatures above the freezing point of water, the controller being arranged to control the heater responsive to a comparison of the temperature of the actual temperature of the ventilation air to the predetermined range of temperatures to maintain the actual ventilation air temperature within the predetermined range of temperatures such that formation of ice is minimized in the aircraft ventilation system;

at least one filter interposed within the duct downstream from the temperature sensor, the filter being ranged to allow the ventilation air to pass therethrough and to minimize the passage of ice therethrough; and at least one shut-off valve interposed within the duct downstream from the filter.

17. The control system of claim 16, wherein the heater is an in-line heater with a rating of about 2.25 kW.

18. The control system of claim 16, wherein the heater increases the ventilation air temperature to at least 35 degrees Fahrenheit.

19. The control system of claim 16, wherein the controller is an analog controller.

20. The control system of claim 16, wherein the controller is a digital controller.

21. The control system of claim 16, wherein the predetermined range of temperatures is about 35 degrees Fahrenheit to about 37 degrees Fahrenheit.

22. The control system of claim 16, further comprising a humidifier interposed within the duct downstream form the heater.

* * * * *

UNITED STATES PATENT AND TRADEMARK OFFICE
CERTIFICATE OF CORRECTION

PATENT NO. : 6,672,541 B2
DATED : January 6, 2004
INVENTOR(S) : Fieldson et al.

It is certified that error appears in the above-identified patent and that said Letters Patent is hereby corrected as shown below:

<u>Title page,</u>
Item [75], Inventors, delete "Gifford" and insert -- Guilford --

Signed and Sealed this

Twentieth Day of April, 2004

JON W. DUDAS
*Acting Director of the United States Patent and Trademark Office*